Jan. 16, 1962 W. D. VAN ZELM ETAL 3,017,163
AERIAL CARGO DELIVERY SYSTEM
Filed Oct. 14, 1959 4 Sheets-Sheet 1
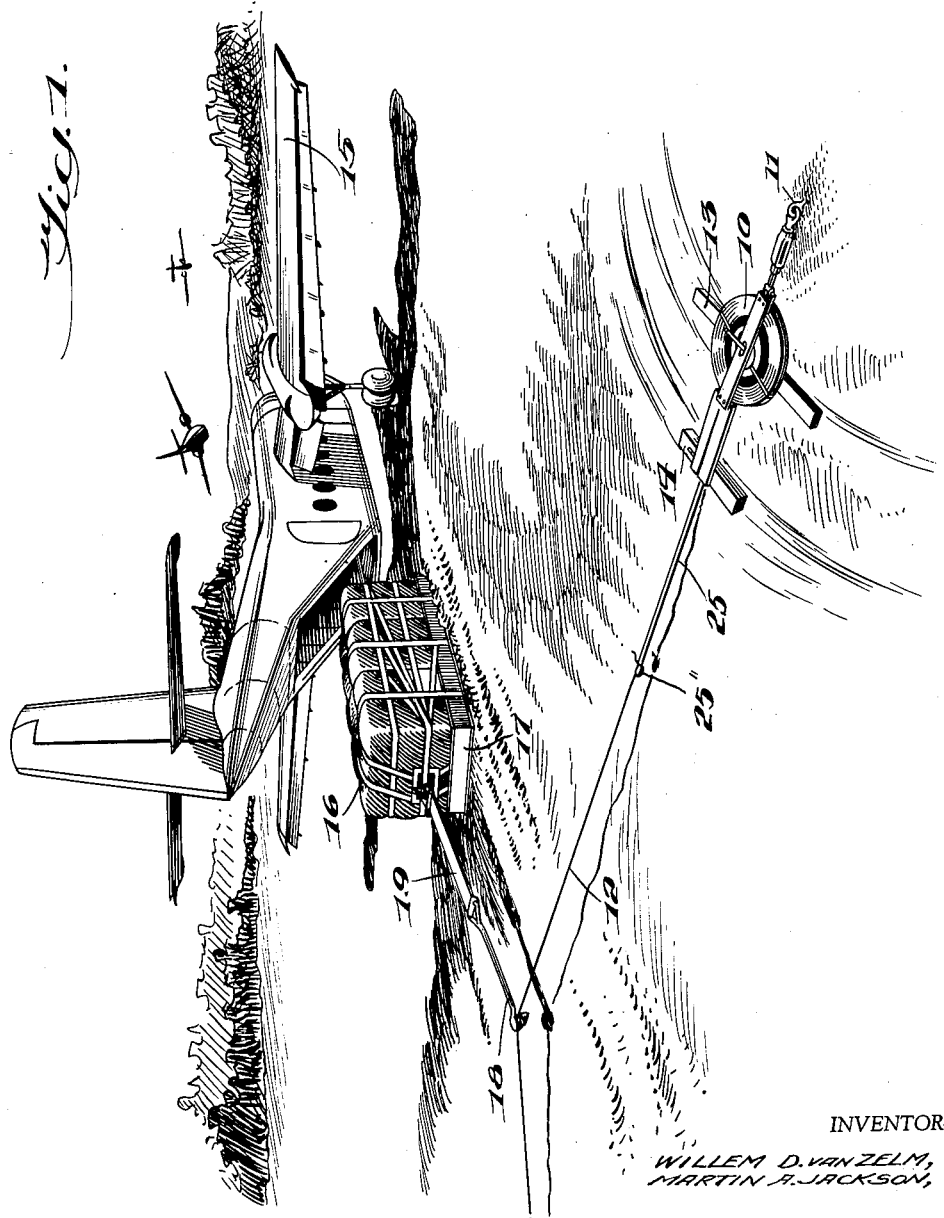
INVENTORS
WILLEM D. VAN ZELM,
MARTIN A. JACKSON,
BY Stevens, Davis, Miller & Mosher
ATTORNEYS Jan. 16, 1962 W. D. VAN ZELM ETAL 3,017,163
AERIAL CARGO DELIVERY SYSTEM
Filed Oct. 14, 1959 4 Sheets-Sheet 2
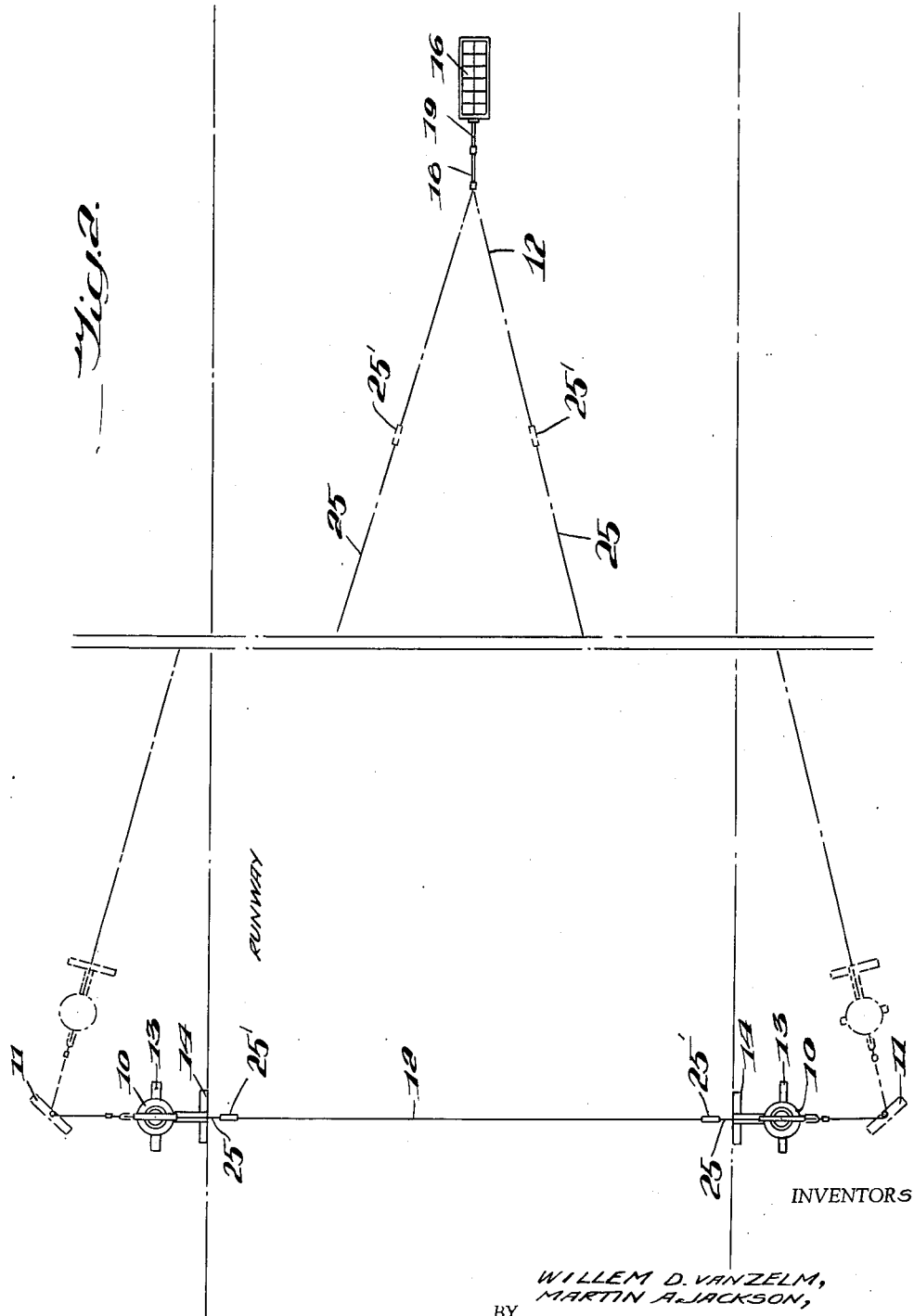
INVENTORS
WILLEM D. VANZELM,
MARTIN A. JACKSON,
BY Stevens, Davis, Miller & Mosher
ATTORNEYS

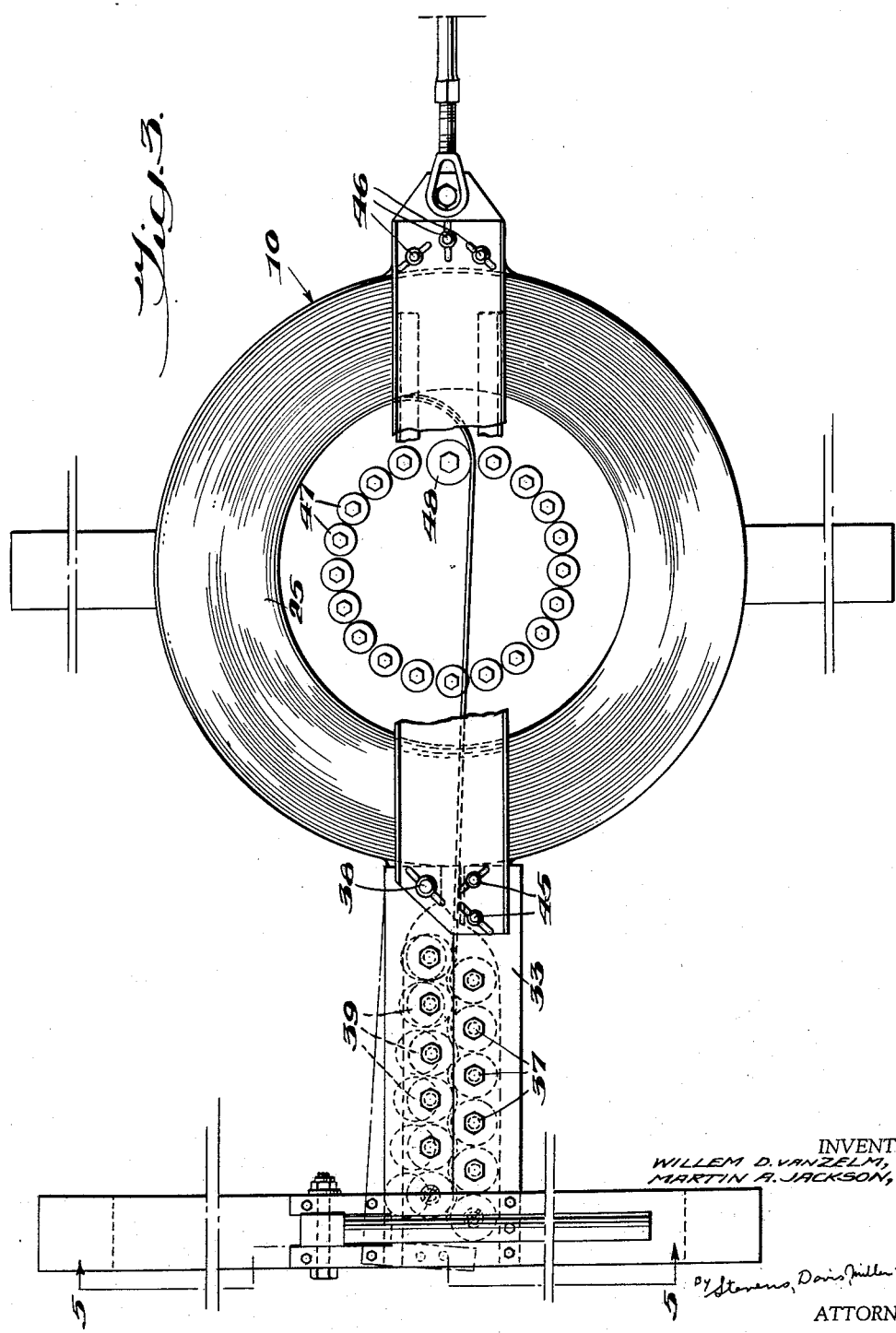

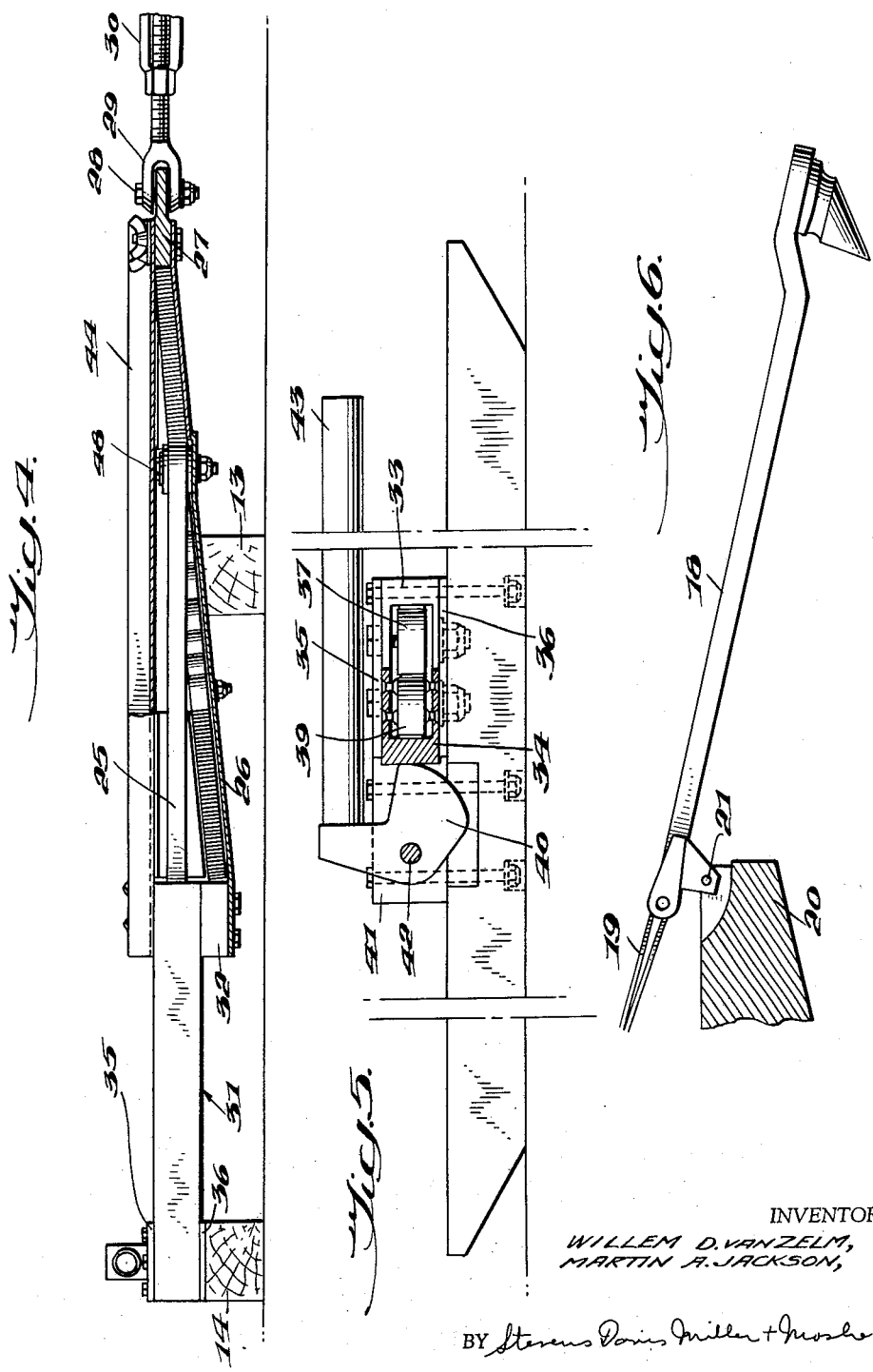

United States Patent Office 3,017,163
Patented Jan. 16, 1962

3,017,163
AERIAL CARGO DELIVERY SYSTEM
Willem D. van Zelm, Ruxton, and Martin A. Jackson, Bradshaw, Md.; said Jackson assignor to Van Zelm Associates Inc., Baltimore, Md., a corporation of Maryland
Filed Oct. 14, 1959, Ser. No. 846,474
11 Claims. (Cl. 258—1.2)

This invention relates to aerial cargo delivery, more particularly to delivery of heavier cargo than can be dropped by parachute and in instances where it is desirable to spot cargo more accurately, in an upright and undamaged condition, than can be done by parachute, or in instances where the cargo delivered is to be rapidly concentrated in a single spot.

Cargo drops by parachute from aircraft have been extensively employed in military operations and in disaster relief situations, but there are instances where, in strong cross-winds, parachute drop cannot be relied upon to spot the cargo in the intended place, nor is it certain that the cargo will land upright and in an undamaged and usable condition. In strong cross-winds, there is a tendency in cargo drop by parachute, to scatter the various loads over the countryside, making it extremely difficult to consolidate and commence operations rapidly, at a time when speed is of the essence. The parachute also imposes an upper load limit on weight, eliminating from air drop operations heavy construction equipment or heavy military equipment.

Energy absorbers to arrest aircraft with a cable and hook are, of course, well known and could be used for this type of cargo extraction. However, to land a 24,000 pound cargo at 135 knots in accordance with this invention, with an aircraft carrier type arresting engine, would require equipment weighing approximately 36,000 pounds which would exceed by 50% the load to be dropped. Such a load could not be handled by parachute drop. Not even the equipment alone for use in accordance with this invention could be dropped at a forward base by parachute. By the system herein described, a cargo of 24,000 pounds can be landed at 135 knots, or 36,000 pounds at 110 knots, all within a cable runout distance of 500 feet. With equipment in accordance with this invention, the total weight of the energy absorber and the metal tape would be about 1,100 pounds per side, of which about 585 pounds would be the tape and 515 pounds would be the metal bender equipment of this invention. It is obvious that this equipment could easily be dropped on location by parachute in anticipation of unloading the greater load. Once the equipment is installed on the ground the maximum tape load (which must be reacted horizontally by the deadman or anchor buried in the ground) would be 34,000 pounds, which is quite feasible with the existing equipment. By way of further example, a 6,000 pound cargo and pallet unit can be unloaded from the aircraft shown in FIGURE 1, contacting the ground at a speed of 70 knots. The energy absorber unit here will weigh only 125 pounds and is approximately 4 feet long and 4 feet across its wooden skids. Tape dimensions for this installation would be .080 inch thick and ¾ of an inch wide and 280 feet long. This tape can be wound in a coil of 25 inches in diameter and weighs only 57 pounds. Thus with a total weight of equipment of units weighing 182 pounds, the 6,000 pound cargo pallet can be safely landed. It is apparent from the dimensions given that at a forward base, the parachute drop could spot equipment and a few men only would be required to install it in anticipation of subsequent unloading of greater cargo. It can readily be installed with unskilled labor and with light hand tools.

It is an object of this invention, therefore, to provide for the delivery of air cargo by air drop whereby the cargo can be quite accurately spotted at a predetermined place on the ground.

It is another object of this invention to provide apparatus for a system of cargo delivery whereby heavy loads can be delivered upright from aircraft to predetermined spots on the ground.

It is a further object of this invention to provide equipment for quickly removing air cargo from an aircraft while the aircraft is in motion relatively close to the ground, practically without the aircraft effecting a landing on a runway.

It is a further object of this invention to provide apparatus for carrying out this method of cargo delivery from an aircraft which is easily installed by relatively unskilled labor under adverse conditions at forward operating bases in military operations.

Further and other objects will be apparent from the description of the accompanying drawings in which like numerals refer to like parts.

FIGURE 1 shows the system in operation with the air cargo being removed from the aircraft as the airplane touches down.

FIGURE 2 shows the plan view of the runway showing a complete ground installation of the system.

FIGURE 3 is a plan view of one unit of the ground installation.

FIGURE 4 is a side elevation partly in section of the unit shown in FIGURE 3.

FIGURE 5 is a view from the left side of FIGURE 3 partly in section.

FIGURE 6 is a detailed view of the cargo arresting hook.

The system of this invention for cargo delivery, for heavier cargos than can be handled in a practical manner by parachute drop, is best shown in the drawings, FIGURES 1 and 2. By way of example, it may be desirable in a military operation to spot heavy cargo at an advance base, in which case the minimum preparation may be required. It may be necessary to prepare the terrain by a bulldozing operation to afford a level area of ground. It will not be necessary to prepare and install a complete runway. However, the system can be used effectively anywhere a runway has been provided.

On each side of the cleared area or the runway, a metal bender energy absorbing unit 10 is installed. This can be done by installing one unit on each side of the cleared area or runway by sinking into the earth a deadman anchor 11 or any other suitable anchoring means about which it may pivot as shown in FIGURES 1 and 2. A suitable cable 12 such as used for aircraft arresting gear is stretched between and may be connected at 25' with each one of the two energy absorbing units 10 across the runway similar to an installation for landing aircraft on an aircraft carrier deck. Energy absorber units 10 are mounted on skids 13 and 14 so that they can readily move in an arc about their anchors 11 over the ground during the arresting operation.

Cargo carrying airplane 15 having a rearwardly opening cargo compartment and hatch is loaded with heavy cargo 16 on a cargo pallet 17 within said cargo compartment. An arresting hook 18 very similar to the tail hook of the carrier based aircraft is provided, which is secured to the rearwardly facing smaller width end of the cargo 16 and pallet 17 unit below its mid-center or C.G. by suitable straps 19 and may also be secured for example to floor 20 adjacent the hatch of the cargo compartment of the aircraft by some frangible means such as a shear pin 21.

The operation of the aircraft in the delivery of the cargo is essentially the same as that used in landing an aircraft on the canted deck of an aircraft carrier, in which the pilot makes a controlled touchdown relatively close thereto at a safe margin above his landing speed and in a rare case where the tail hook misses the arresting cable, he merely flies off and makes another pass. In a similar manner, the pilot of the cargo aircraft will make a controlled approach toward cable 12 at the forward base prepared with the above described cargo landing and energy absorbing arresting gear installation. Tail hook 18 in this case, attached to and extending downwardly and rearwardly of cargo 16 as indicated will engage cable 12, which will pay out in a manner that will be subsequently described and when a predetermined force is obtained in the cable and hook assembly, the frangible fastening means 21 will break and cargo 16 will be slidably extrated in upright position from aircraft 15 through the hatch of the rearwardly opening compartment. Since the vertical drop of the cargo unit from the cargo compartment to the ground at this time is relatively short, noting FIGURE 1, the unit will land stably on its pallet 17. Aircraft 15 flies off at a steep angle of climb due to the immediately available excess lift. It can be seen therefore that aircraft 15 need only fly so that the lower end of hook 18 is momentarily proximate to cable 12 or barely touch down in the vicinity of the cable at higher than normal landing speeds. As soon as it is relieved of the cargo, the aircraft will quickly climb to a safe altitude for return flight.

The energy absorber metal bender 10 used in this system is illustrated in FIGURES 3, 4 and 5. In these figures a coil of metal tape 25 which may be connected in any desired manner to cable 12 at 25' is shown mounted on a plate 26 supported by a transverse skid 13. Plate 26 is shown inclined at an angle such that when tape 25 is removed from the inside of the coil to pay out cable 12 when the latter is engaged by hook 18, the tape is in a horizontal position. One end of plate 26 is mounted on a fitting 27 which in turn pivots at 28 on eye 29 of a turnbuckle 30, the other end of which is secured to the deadman anchor 11 buried in the ground. The diametrically opposite side of toe plate 26 is secured to an elongated frame member 31, the outer end of which is mounted on a second transverse skid 14. The two skids 13 and 14 afford support for the assembly as it moves over the ground in an arcuate path around the anchor member 11.

Elongated member 31 is secured to plate 26 by spacer block 32. Elongated member 31 consists of two channel members 33 and 34 mounted between two plates 35 and 36. Channel member 33 is rigidly fixed with respect to the plates, 35, 36 and space block 32 and the second skid 14. Channel member 33 has mounted between its flanges, a plurality of rollers 37. Channel member 34 is pivoted at a bolt 38 and also carries a plurality of rollers 39 such that rollers 39 can be moved outwardly from an inter-engaging position so that the tape 25 may be easily threaded from the inside of the coil between the rows of rollers 37 and 39.

A cam 40 is mounted on bracket 41 and pivoted at 42 such that when handle 43 of cam 40 is lifted, movable channel 34 will move outwardly to permit threading of tape 25 between the two sets of rollers 37 and 39 and when handle 43 of cam 40 is moved downwardly, the cam will be actuated to move channel member 34 adjacent channel member 33 so that the plurality of rollers 37 and 39 inter-engage and crimp tape 25. The system can now be pretensioned by turnbuckle 30, and is ready to react to any pull on the crossfield pendant with a nearly constant amount of stress in tape 25.

A cover member 44 is shown secured at each end on each side of the coil of tape 25 by wing nuts 45, 46 which are readily removable so that cover member 44 may be removed and a new coil of tape 25 placed on plate 26 for successive operation of the energy absorbing device.

Plate 26 also carries a plurality of rollers 47 mounted on and perpendicular to plate 26 and a further roller 48 canted at an angle to pass tape 25 from the inside of the coil over the opposite inside edge of the coil in a generally horizontal position. It will be seen from FIGURE 3, as tape 25 is pulled over large roller 48 tape 25 will collapse from the inside of the coil into a position adjacent rollers 47 as cable 12 is engaged by hook 18 to remove the cargo 16 from the airplane 15.

Any suitable means, of course, may be employed to pivot cable hook 18 and the frangible means 21 restraining the cargo 16 may be connected anywhere between the cargo or cargo pallet and the interior of the cargo compartment in the airplane.

It is understood that certain changes, alterations, modifications and substitutions may be made in the foregoing description of the preferred embodiment, without departing from the spirit and scope of the appended claims.

What is claimed is:

1. A system, for use with a cargo aircraft of the type having a rearwardly facing cargo compartment and hatch, for the removal of cargo from such aircraft while in motion over the ground, comprising a cargo pallet of a size to be positioned in said cargo compartment, an elongated hook member, means to hinge said hook member adjacent the rearward end of said cargo compartment of said aircraft including means to disengage said hook member from said aircraft upon a predetermined load on said hook member, cable means stretched close to the ground transversely of the path of motion of said aircraft, said hook member being of sufficient length to engage said cable means, means interconnecting said hook member and said cargo pallet, said hinge means restraining said cargo hook member in attachment with said compartment until a predetermined pull is exerted by said hook member, said cable means having means on each end to anchor said cable to the ground, coil means adjacent the ends thereof containing extensions on said cable means, and means adjacent the ends thereof to yieldingly resist the paying out of said cable means from said coil means with a predetermined restraining force as said cargo aircraft moves along a path away from engagement of said hook member with said cable means.

2. The system set forth in claim 1 in which said means yieldingly resisting the paying out of said cable extension means comprises a frame member, means on one end to secure said frame member to move about and provide for said anchor means, two rows of intermeshed rollers mounted on the other end of said frame member, the axes of all of the rollers being parallel, said cable extension means including a metal filament formed into a flat coil mounted on said frame member between said end adjacent said anchor means and said rollers so positioned that the inner end of said metal filament of said coil feeds into and between said rows of rollers and follows a serpentine path therebetween, said end of said metal filament being secured to said cable after passing between said rows of rollers.

3. The device as set forth in claim 2 in which said frame member is mounted on transverse skid members, one positioned under the outer end of said rows of rollers and the other positioned under said coil.

4. The device as set forth in claim 2 in which means are provided to separate said rows of rollers in spaced relation to thread said filament of metal therebetween and remesh said rollers on said filament.

5. A system including a cargo aircraft of the type having a rearwardly facing cargo compartment with a rearwardly disposed hatch, for the removal of cargo from said aircraft while in motion over the ground, comprising a cargo-pallet unit of a size to be positioned in said cargo compartment, an elongated hook member, means to hinge said hook member adjacent the rearward end of said cargo compartment to extend downwardly of said aircraft, said hook member being disengageable from said aircraft upon a predetermined load thereon, means interconnecting said hook member and said cargo-pallet unit, said hinge including means restraining said cargo hook member in attachment with said compartment until a predetermined pull is exerted on said hook member, cargo-arresting cable means stretched above the ground transversely of the path of motion of said aircraft, said cable means paying out when a predetermined loading is applied substantially transversely thereto, said hook member being of sufficient length to engage said cable means when the path of motion of said aircraft is above and proximate to said cable means, said cable means having means on each end to anchor said cable means to the ground, cable extension storage means adjacent at least one of the ends thereof providing for pay out of said cable extension means, and means adjacent said storage means to yieldingly resist the paying out of said cable means with a predetermined restraining force as said cargo aircraft moves along a path away from engagement of said hook member with said cable means.

6. A system including a cargo aircraft of the type having a rearwardly facing cargo compartment and rearward hatch therefor for the removal of cargo from said aicraft while in motion over and near a ground surface, comprising a pallet-supported cargo unit to be positioned in said compartment, an elongated hook member mounted in said compartment and having a major portion thereof extending outwardly of said hatch and downwardly to a point below said compartment, flexible means connecting the upper end of said hook member to the cargo unit at a point below the mid-center of the rearwardly facing end of said cargo unit, frangible means holding said hook member and said cargo unit in said compartment until a predetermined pull is exerted on the outwardly and downwardly extended portion of said hook member, cable means including a cable and extensions thereon having end locations stretched close to and generally parallel to the ground transversely of the path of motion of the aircraft, said hook member being of sufficient length to engage said cable when the aircraft is flown over and closely proximate said cable, said cable means having means at each of said end locations to anchor it to the ground, and means provided at least one of said end locations to store and pay out said cable extension means with a predetermined restraining force as said cargo aircraft moves along a path away from engagement of said hook member with said cable means.

7. A system including a cargo aircraft of the type having a rearwardly facing cargo compartment having a rearwardly located cargo hatch for the removal of cargo while said aircraft is in motion closely adjacent the ground surface, comprising a cargo unit disposed in said compartment, an elongated hook member depending from said hatch, frangible means hingedly mounting said hook member on the floor of said compartment adjacent said hatch, strap means attached to the hook member adjacent said frangible hinge means extended to and connected to the rearward end of said cargo unit, said frangible hinge means retaining said hook member and cargo unit within said cargo compartment until a predetermined pull is exerted on the depending end of said hook member, said frangible hinge means releasing said hook member and cargo unit from any holding connection with said compartment when said predetermined pull is exerted on said hook member, cable means extending transversely of and close to the ground and disposed in the flight path of said aircraft, said hook member being of sufficient length to engage said cable means when the path of motion of said aircraft is closely above and proximate to said cable means, said cable means having means on each end location to anchor said cable means to the ground, cable pay-out means at each cable end location, and retarder means adjacent said pay-out means to yieldingly resist the paying out of said cable means when said cable means is engaged by said hook member with a predetermined restraining force as said cargo moves along a path away from engagement of said hook member with said cable means.

8. A system for safely handling heavy cargo from a cargo transport aircraft comprising, a cargo aircraft of the type having a rearwardly opening compartment and hatch, for the removal of a cargo unit upright from said aircraft while in motion over and relatively near a ground surface comprising, a pallet-supported cargo unit of a size to be positioned in said cargo compartment, frangible means retaining said pallet-supported cargo unit in said cargo compartment, an elongated hook member having connection at one end to the rearwardly facing end of said pallet-supported cargo unit at a point below its mid-center within said cargo compartment said connection including a flexible elongated member, the opposite end of said hook extending downwardly from said hatch to a point below the compartment, said cargo unit becoming frangible disconnected from said frangible retaining means upon a predetermined load on said hook member, cable means including a cable stretched generally parallel to and relatively close to the ground transversely of the path of the aircraft, said hook member being of sufficient length to engage said cable, when the path of said aircraft is above and proximate to said cable means, said cable means having means at each end location thereof anchoring it to the ground, said cable means paying out when a predetermined loading is applied by said hook member substantially transversely thereto, and pay-out means at least one of said cable end locations including energy absorbing means to yieldingly resist the paying out of said cable means with a predetermined restraining force as said aircraft moves along a path away from engagement of said hook member with said cable means.

9. The system as set forth in claim 6 wherein said energy absorbing means to yieldingly resist the paying out of said cable with a predetermined resisting force comprise a separate energy absorbing means located at each of said cable end locations.

10. The system as set forth in claim 1 wherein said means interconnecting said hook member and said cargo-pallet unit comprises strap means, said strap means being secured to the rearwardly facing end of said cargo-pallet unit at a point below its mid-center whereby the said unit will engage the ground in a stable position when withdrawn from said cargo compartment of said aircraft by said cable means.

11. The system as set forth in claim 1 in which said means yieldingly resisting the paying out of said cable extensions comprises a frame member, means on one end thereof to secure and provide for said frame member to move arcuately about said anchor means, two rows of interpositioned non-contacting rollers mounted on the opposite end of said frame members, the axes of all of the rollers being parallel, said cable means including a flexible metal strip forming said coil means on said frame member between said one end adjacent said anchor means and said rollers and so positioned that the inner end of said metal strip of said coil feeds into and between said rows of interpositioned rollers and follows a serpentine path therebetween, said end of said metal strip being secured to said cable at a point intermediate the rows of interpositioned rollers and the opposite anchored end of said cable means.

References Cited in the file of this patent
UNITED STATES PATENTS

| | | |
|---|---|---|
| 1,439,927 | Uppercu | Dec. 26, 1922 |
| 1,499,472 | Pratt | July 1, 1924 |
| 2,483,655 | Schultz | Oct. 4, 1949 |